US012664376B1

(12) United States Patent
Duttagupta et al.

(10) Patent No.: US 12,664,376 B1
(45) Date of Patent: Jun. 23, 2026

(54) AUTOMATED REGULATORY REPORTING SYSTEM USING LARGE LANGUAGE MODELS

(71) Applicant: Morgan Stanley Services Group Inc., New York, NY (US)

(72) Inventors: Kallol Duttagupta, Basking Ridge, NJ (US); Kumar Vadaparty, Belle Mead, NJ (US); Thomas Mathew, Parsippany, NJ (US); Baiju M. Mohammad Basheer, Essex (GB); Callum A. Fay, Glasgow (GB); Christopher G. Hall, Sidcup (GB); James Oswald, London (GB); Sean McGarvey, Glasgow (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/336,009

(22) Filed: Sep. 22, 2025

(51) Int. Cl.
*G06F 40/40* (2020.01)
*G06F 9/451* (2018.01)
*G06F 9/50* (2006.01)

(52) U.S. Cl.
CPC .............. *G06F 40/40* (2020.01); *G06F 9/451* (2018.02); *G06F 9/5066* (2013.01)

(58) Field of Classification Search
CPC ......... G06F 40/40; G06F 9/451; G06F 9/5066
See application file for complete search history.

(56) References Cited

U.S. PATENT DOCUMENTS

| | | | |
|---|---|---|---|
| 12,045,610 B1 | 7/2024 | Myers et al. | |
| 12,105,729 B1 | 10/2024 | Haq et al. | |
| 12,339,886 B1 * | 6/2025 | Jackson | G06F 16/383 |
| 12,360,791 B1 | 7/2025 | Vadaparty et al. | |
| 12,436,957 B1 * | 10/2025 | Kumar | G06F 16/2425 |
| 12,450,243 B1 * | 10/2025 | Silver | G06F 8/75 |
| 2023/0208869 A1 | 6/2023 | Bisht et al. | |
| 2023/0252233 A1 | 8/2023 | Gutierrez et al. | |
| 2024/0248963 A1 | 7/2024 | Parham et al. | |
| 2024/0354234 A1 | 10/2024 | Dey et al. | |
| 2025/0061290 A1 * | 2/2025 | Gardner | G06F 40/56 |
| 2025/0272323 A1 * | 8/2025 | Mohite | G06F 16/435 |
| 2025/0294061 A1 * | 9/2025 | Arkoff | H04L 63/20 |

* cited by examiner

*Primary Examiner* — Pierre Louis Desir
*Assistant Examiner* — Daniel W Chung
(74) *Attorney, Agent, or Firm* — K&L Gates LLP

(57) ABSTRACT

Computer-implement system and method respond to regulatory queries using a modular orchestration framework that leverages large language models (LLMs). A backend computer system receives a regulatory query from a user and identifies subtasks such as regulation interpretation, task matching, and code explanation. For each subtask, the system retrieves a pre-authored natural language prompt from a prompt library and invokes an LLM hosted remotely to generate an intermediate output. The orchestration engine processes the intermediate outputs to produce a structured, machine-readable response, which is returned to the user device. Subtasks may be executed via specialized agents or services, and the structured response may include regulatory summaries, task metadata, and source code explanations. The architecture enables scalable, context-sensitive use of general-purpose LLMs for compliance-related reasoning, while improving traceability, consistency, and output structure through prompt curation and task orchestration.

20 Claims, 4 Drawing Sheets

80

Text with LLM-generated response to user query

82

84

Text with LLM-generated summary of applicable regulatory requirement

CODE ID 001
CODE ID 002
CODE ID 003

JIRA 001

CODE ID 004
CODE ID 005

JIRA 002

86

JIRAs

JIRA 001
- Summary
- Relevance score

JIRA 002
- Summary
- Relevance score

88

Implementation code

JIRA 001

CODE ID 001
- Summary

CODE ID 002
- Summary

CODE ID 003
- Summary

AUTOMATED REGULATORY REPORTING SYSTEM USING LARGE LANGUAGE MODELS

CROSS-REFERENCE TO RELATED APPLICATIONS

The present application is related to the following patent applications of Applicant, which are incorporated herein by reference in their entirety: (1) Ser. No. 18/787,750, filed Jul. 29, 2024, titled "Generating New Software Code from Legacy Software Code Using Large Language Modes," now U.S. Pat. No. 12,360,791, issued Jul. 15, 2025; (2) Ser. No. 19/080,275, filed Mar. 14, 2025, titled "Multi-Language Program and Data Flow Analysis Using LLM"; (3) Ser. No. 19/191,343, filed Apr. 28, 2025, titled "Standardizing Enterprise Software Code Through LLMs."

BACKGROUND

In today's global financial landscape, large institutions and technology-driven enterprises face unprecedented challenges in regulatory compliance and operational knowledge management. The proliferation of complex financial products, such as derivatives, coupled with the expansion of operations across multiple jurisdictions, has resulted in a fragmented and rapidly evolving regulatory environment. Each country or region imposes its own unique set of compliance guidelines and reporting requirements, demanding that organizations maintain a high degree of accuracy, transparency, and agility in their compliance processes.

Traditionally, compliance and knowledge management within these organizations have relied heavily on manual processes and the expertise of Subject Matter Experts (SMEs). Teams are often required to painstakingly cross-reference regulatory documentation, track development tasks, and reverse engineer legacy codebases to ensure that regulatory requirements are properly implemented and maintained. This manual approach is not only time-consuming and resource-intensive, but it is also highly susceptible to human error, knowledge silos, and operational bottlenecks. The resulting inefficiencies can lead to delayed responses to regulatory inquiries, increased risk of non-compliance, and significant operational costs.

The rapid pace of regulatory change, frequent personnel turnover, and the increasing complexity of financial systems further exacerbate these challenges. New employees require extensive onboarding to become proficient in both the regulatory landscape and the organization's internal systems, placing additional strain on SMEs and increasing the risk of knowledge loss. Moreover, the need for transparent, audit-ready documentation and the ability to quickly respond to regulatory audits and reviews have become critical success factors for maintaining trust and competitiveness in the financial sector.

SUMMARY

In one general aspect, the present invention is directed to systems and methods for using a large language models (LLM) to assist with regulatory compliance. More specifically, the invention provides, in various embodiments, a computer-implemented framework in which an orchestration engine receives a regulatory query and coordinates multiple subtasks—such as interpreting regulations, identifying related task records, and generating code explanations—by invoking a large language model using task-specific prompts retrieved from a structured prompt library. The orchestration engine integrates intermediate outputs of the subtasks into a structured, machine-readable response that is returned to the user. The system may be implemented across a backend computing system and remote LLM infrastructure, enabling modular and scalable deployment.

In various embodiments, the orchestration engine may execute the LLM invocation logic as a stateless microservice or callable software agent. Task-specific prompts may define function roles and structured reasoning strategies. Agentized components may include a regulation summary agent, a task-matching agent, and a code explanation agent, each coordinated via a workflow graph. The structured response returned to the user may include distinct sections for regulatory summaries, relevant task records, and associated source code explanations. Additional features may include formatting the output according to user role and deploying the orchestration engine as a containerized cloud service.

By organizing prompt management and LLM interactions through a programmable orchestration engine and pre-authored prompt library, the system improves the reliability, consistency, and traceability of LLM outputs for compliance tasks. The structured, machine-readable response format facilitates downstream integration with software development and audit systems. The use of modular, agent-like invocation pathways allows the LLM to be used in a compositional and context-sensitive manner, improving interpretability and enabling system robustness through input/output validation and workflow control. These and other benefits that can be realized through embodiments of the present invention will be apparent from the description that follows.

FIGURES

Various embodiments of the present invention are described in conjunction with the following figures.

DESCRIPTION

The present invention provides, in various embodiments, systems and methods for automating regulatory compliance management and enterprise knowledge retrieval using an AI-driven orchestration framework. In particular, the invention leverages a generative language model (LLM) in conjunction with enterprise data sources to autonomously retrieve, interpret, and disseminate regulatory information. The system can be configured to receive natural language queries from end users, retrieve relevant task and code artifacts from internal systems, and generate structured, multi-part responses that include regulatory summaries, task descriptions, code analysis, and graphical representations of implementation mappings. The invention reduces reliance on human subject matter experts (SMEs), accelerates compliance workflows, and improves transparency, auditability, and onboarding efficiency in complex enterprise environments.

Figure 1:
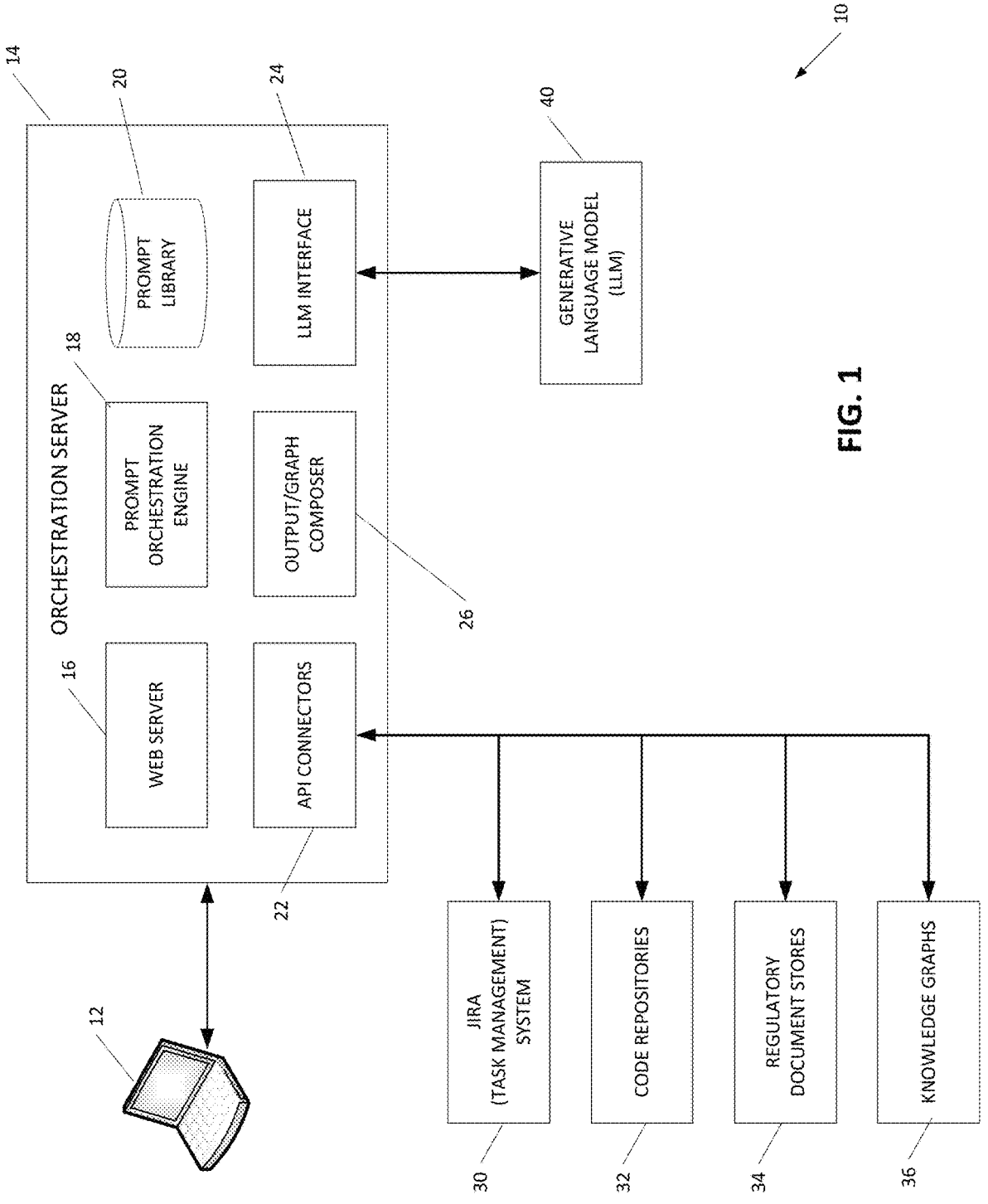
FIG. 1 is a block diagram of a system for automated regulatory reporting using a generative AI, large language model according to various embodiments of the present invention.

Embodiments of the present invention will now be described in connection with the exemplary system 10 shown in FIG. 1. As illustrated, system 10 includes a user device 12, such as a desktop or laptop computer, configured to receive and display outputs generated by the system and to allow a user to submit natural language prompts. The user device 12 communicates with an orchestration server 14 (e.g., a backend computer system), which is responsible for coordinating all processing, data retrieval, prompt management, and interaction with a generative language model.

The orchestration server 14 includes several functional components. A web server 16 is configured to serve a user interface to the user device 12 and to receive user prompts via a network connection. A prompt orchestration engine 18 receives the user prompt, parses the intent, and identifies appropriate prompt templates to handle the request. These templates are stored in a prompt library 20, which contains a set of reusable, domain-specific prompt structures associated with various compliance-related tasks. In various embodiments, the prompt orchestration engine 18 may be implemented with an agentic system, such as described below in connection with FIG. 4.

The orchestration server 14 also includes API connectors 22 that are configured to retrieve information from various internal enterprise systems. These systems include, but are not limited to, a JIRA system 30 (or other task management system), code repositories 32, regulatory document stores 34, and knowledge graphs 36. The API connectors 22 may perform authenticated API calls, parse returned content, and extract metadata required to fulfill the prompt.

Once relevant data has been retrieved and the appropriate prompt has been constructed, the LLM interface 24 transmits the prompt to an external generative language model (LLM) 40, which may be hosted by a third-party service provider such as OpenAI. The LLM interface 24 is also configured to receive the output from the LLM 40, which may include textual summaries, explanations, and structured relationships among regulatory elements, tasks, and code modules.

The results received from the LLM 40 are then processed by an output/graph composer 26, which formats the responses for display and generates any associated visualizations. For example, the output/graph composer 26 may construct a graph showing relationships between JIRA tickets and source code components, embed hyperlinks to internal systems, and produce a multi-part response that includes summaries of regulatory rules, task descriptions, code analyses, and visual aids.

In this configuration, the LLM 40 preferably does not have direct access to the internal enterprise systems 30-36. Instead, the orchestration server 14 can serve as an intermediary, retrieving data from internal systems, optionally filtering or formatting it, and providing only the necessary context to the LLM 40. This architecture supports robust data governance, security, and auditability while enabling the use of external generative models for enterprise compliance tasks.

Figure 2:
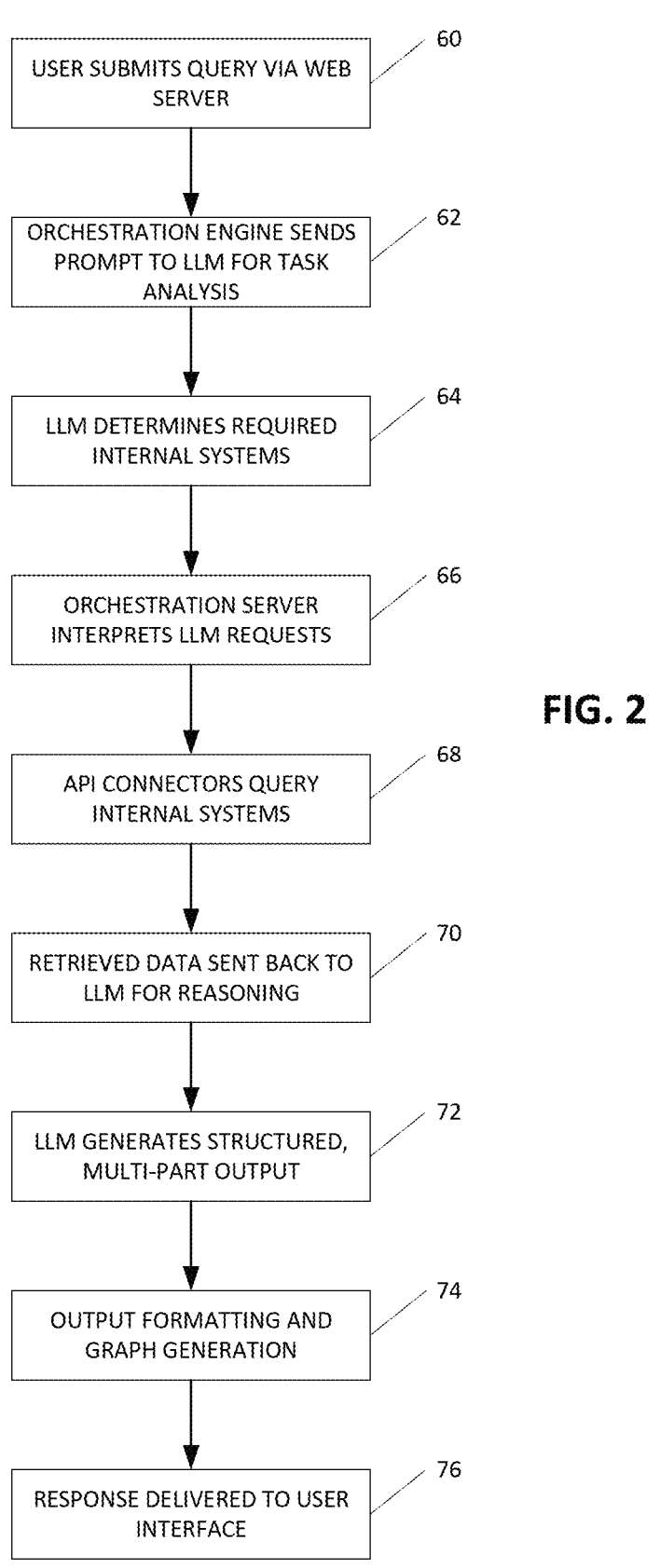
FIG. 2 is flow chart of a process flow performed by the system of FIG. 1 according to various embodiments of the present invention.

Referring now to FIG. 2, an exemplary process flow is illustrated for generating a structured response to a user-submitted query using an orchestration server and a generative language model. The steps shown in FIG. 2 are illustrative and may be implemented in various orders or combinations, or with additional steps or variations, depending on the particular embodiment.

At step 60, a user 12 submits a query via the web server 16. As discussed herein, the user may interact with the system through a browser-based interface served by the web server 16 of the orchestration server 14. The query may be phrased in natural language and request information about regulatory compliance, system behavior, onboarding guidance, or any other enterprise-relevant knowledge. For example, the user may enter a query such as, "How do we implement Regulation X in relation to our ABC trading system?" The query is transmitted over a network (e.g., HTTPS over TCP/IP) to the orchestration server 14.

At step 62, the orchestration engine 18 sends a prompt, via LLM interface 24, for the query to the generative language model (LLM) 40 for task analysis. In some embodiments, the query is submitted to the LLM in its raw form. In other embodiments, the orchestration engine 18 may add contextual metadata or system descriptions to the prompt, such as a listing of available data connectors or known regulatory ontologies. The LLM 40 may be a transformer-based model such as GPT-4 or a similar large language model hosted by a third-party provider (e.g., OpenAI) or deployed on-premises. The LLM 40 receives the input as a sequence of tokens, processes the input using attention-based layers, and produces an output comprising structured instructions, task decomposition, or next-step directives.

In some embodiments, the orchestration engine 18 may also provide the LLM 40 with access to the curated prompt library 20, which includes task-specific or domain-specific prompt templates. These prompt templates are pre-authored, structured prompts that may include slot-based placeholders to be dynamically populated based on the user's query, retrieved context, or metadata. Each template is designed to elicit optimal responses from a transformer-based model (e.g., GPT-4) in a particular task domain—such as summarizing a regulatory requirement, extracting code relationships from issue trackers, or synthesizing knowledge across multiple systems.

The prompt library 20 may be implemented as a version-controlled repository, allowing prompt engineers or subject matter experts to develop, test, and refine prompts over time based on model behavior and task outcomes. In some embodiments, each prompt template may include annotations or metadata indicating intended use cases, known limitations, fallback strategies, or token budgeting constraints. These prompt templates may be exposed to the LLM 40 as descriptions of available functions, workflows, or reasoning strategies. In one embodiment, the orchestration engine 18 retrieves the appropriate prompt templates from the library and injects them into the prompt before sending it to the LLM 40. In another embodiment, the LLM 40 may be configured to reason over available templates and select or compose an appropriate one based on the user's query. For example, the LLM 40 may determine that a "summarize regulation" prompt, a "query JIRA tickets" prompt, and a "code module explanation" prompt should be used in sequence to fulfill the user's request. The orchestration engine 18 may optionally provide additional context, such as a listing of available data connectors or known regulatory ontologies.

At step 64, the LLM 40 determines which internal systems should be queried in order to fulfill the user's request. Based on its understanding of the prompt and its internal reasoning capabilities, the LLM 40 may identify that information is needed from one or more enterprise systems, such as: the task management system (e.g., JIRA) 30 for locating development tickets associated with Regulation X; the code repository (e.g., GitHub, Bitbucket) 32 to retrieve source code files referenced in those tickets; the regulatory document store 34 to summarize relevant clauses of Regulation X; and the knowledge graph 36 to identify the relationships between systems, data entities, or compliance artifacts.

At step 66, the orchestration server 14 interprets the LLM's output to identify and prepare data access requests. In some embodiments, the LLM 40 produces a function call in a structured format (e.g., JSON) that specifies the system to access and any query parameters. The orchestration engine 18 can parse this instruction and maps it to an internal connector or query handler. Preferably, the LLM 40 is not granted direct access to internal enterprise systems; instead, the orchestration server 14 mediates data access, maintaining enterprise data governance and security boundaries.

At step 68, API connectors 22 query the relevant internal system(s) based on the LLM's inferred needs. These API connectors 22 are configured to securely access enterprise systems using predefined credentials, access tokens, or internal service roles. For instance, a JIRA connector may use RESTful API endpoints to retrieve tickets with specific labels or keywords; a code repository connector may use Git APIs to retrieve code diffs or linked commits; a regulatory document connector may use full-text search or semantic matching to locate relevant clauses; and a graph database connector may issue Cypher or SPARQL queries to retrieve subgraphs or paths related to the query topic.

At step 70, retrieved data is sent back to the LLM 40, either as part of a new prompt or via a structured function-calling interface. The orchestration server 14 may optionally pre-process or normalize the retrieved data before submission—for example, extracting only the title and description fields from a JIRA ticket, or limiting code snippets to the first one hundred lines. This ensures that token budgets are managed efficiently when interacting with token-limited models.

In some embodiments, the system includes or invokes a regulatory interpretation engine that enables the generative model to extract, infer, or operationalize regulatory obligations based on natural language regulatory documents. This engine may function as part of the LLM 40 or as a wrapper module that structures the task for the LLM. Using prompt engineering and optionally augmented with regulatory ontologies, the interpretation engine enables the system to identify and express actionable regulatory requirements in structured or semi-structured form. For example, given a prompt such as "Summarize the implementation requirements of Regulation X," the engine may produce output such as "The system must retain customer authentication logs for 7 years" or "The trading algorithm must halt execution if real-time exposure exceeds 10%." These requirements may be tagged with metadata, such as obligation type (e.g., retention, risk threshold, auditability), associated regulatory clauses (e.g., § 4.3 of Reg X), or applicable system components. In some embodiments, the regulatory interpretation engine uses a combination of template-guided LLM prompting, retrieval-augmented generation (RAG) over a regulation corpus, and similarity scoring against historical compliance patterns. This allows the system to translate textual compliance requirements into machine-understandable form, which can then be cross-referenced with JIRA tickets, system logs, or source code functionality.

At step 72, the LLM generates a structured, multi-part output. This output may include: a natural language explanation summarizing the implementation of the queried regulation; a summary of the regulation's key provisions; a list of relevant JIRA tickets with descriptions and links; a plain-language summary of code modules or call flows implementing the regulation; and a graph showing relationships among the retrieved items. In some embodiments, the LLM 40 may format its output using Markdown, HTML, or a custom schema that facilitates downstream rendering and presentation.

At step 74, the output/graph composer 26 formats the response and, if needed, generates visual representations such as dependency graphs or traceability trees. For example, with reference to the example user interface output shown in FIG. 3, described further below, a graph may show nodes representing JIRA tickets and source code files, with directed edges showing which tickets relate to which code modules. Graphs may be constructed using backend libraries (e.g., NetworkX, Graphviz) or frontend-rendered using JavaScript libraries (e.g., D3.js, Mermaid).

At step 76, the web server 16 delivers the response to the user interface. The complete multi-part response can be returned to the user's browser, typically rendered as a structured web page containing the LLM-generated explanation, links to internal resources, summaries, and visual elements. In some embodiments, the interface may allow the user to interact with the response—for example, by clicking on a JIRA link to view the full ticket, expanding or collapsing summaries, or navigating a dynamic graph.

In this manner, the flow of FIG. 2 enables users to submit complex, high-level queries and receive structured, context-aware responses generated by AI, with enterprise data securely accessed and orchestrated behind the scenes.

In some embodiments, the system may include a self-learning feedback loop configured to improve performance and relevance over time based on user interactions. After a response is delivered to the user, the system may optionally prompt the user for feedback, such as whether the response was helpful, accurate, or complete. The user interface may include explicit feedback tools—such as thumbs-up/down indicators, numeric rating scales, or open-text comment boxes—that allow the user to provide evaluations or suggested corrections. Alternatively, feedback may be inferred from user behavior, such as which links are clicked, whether the user follows up with additional queries, or how long the user spends viewing a particular section.

This feedback can be processed by the orchestration server 14 to update prompt selection heuristics, prompt template parameters, or prompt library 20 entries. In some embodiments, feedback may be used to flag prompts or data sources for human review or curation. In other embodiments, the feedback is formatted into structured metadata (e.g., JSON objects) and used to inform reinforcement learning or fine-tuning of the generative language model 40, either directly or via human-in-the-loop workflows. For instance, if the LLM consistently misinterprets certain regulatory queries, feedback data can be used to train more robust prompt variants or trigger the inclusion of clarifying context.

The feedback loop may operate asynchronously, allowing for batch processing of feedback logs or periodic retraining cycles. Additionally, privacy-preserving techniques such as differential privacy or federated learning may be employed to protect sensitive enterprise data while still enabling iterative model improvement.

Figure 3:
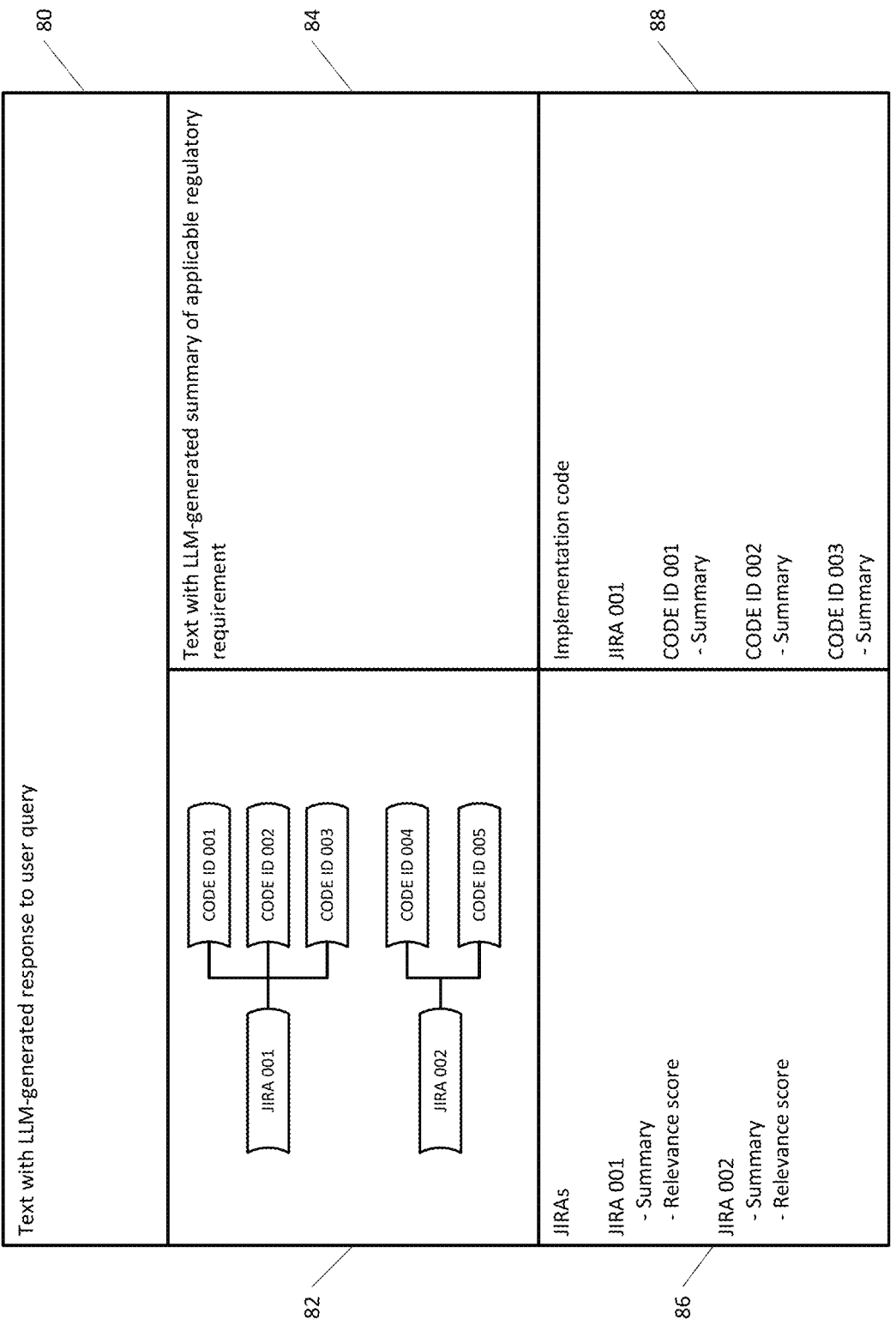
FIG. 3 illustrate an exemplary user interface template generated by the system of FIG. 1 according to various embodiments of the present invention.

FIG. 3 illustrates an exemplary user interface generated by the orchestration system in response to a user-submitted query. The layout and elements shown in FIG. 3 are illustrative and may vary depending on implementation details, access controls, or user preferences. In general, the interface provides a structured, multi-part response that integrates natural language explanations, regulatory analysis, system metadata, and code traceability to assist the user in understanding how a particular regulation or requirement is addressed within the enterprise's software systems.

A first portion of the interface includes a response field 80, which contains the generative language model's (LLM's) top-level response to the user's query. This response is typically composed in natural language and formatted as a summary or explanatory narrative. The original user query may also be displayed in field 80, either at the top of the section or embedded within the LLM's response, to provide context and continuity for the user.

A separate section, labeled as field 84, presents a focused summary of the regulatory requirement or policy standard that is the subject of the user's query. This summary is generated by the LLM and may be derived from internal or external regulatory document stores accessed during system operation. The content in field 84 helps anchor the response by clearly explaining what the regulation requires, thereby allowing the user to understand how subsequent implementation details relate to the compliance objective.

Field 82 displays a graphical visualization that maps relevant JIRA tickets to the code segments they affect or are associated with. The graph may represent JIRA tickets as nodes and draw edges to nodes representing corresponding source code files or functions. In some embodiments, the JIRA tickets explicitly identify the associated code segments—e.g., via links, commit IDs, or filenames—and the orchestration engine extracts this information directly. In other embodiments, the code segment associations may be inferred by the LLM or orchestration system based on semantic similarity, commit metadata, knowledge graph traversals, or vector similarity queries against the codebase. This dual-path capability supports more robust code traceability, even in cases where JIRA metadata is incomplete.

Field 86 provides a structured list of the relevant JIRA tickets. For each ticket, the LLM generates a textual summary that distills the key information, such as the purpose of the ticket, the systems it touches, and the regulation it supports. Each JIRA entry may include a relevance score—e.g., normalized between 0.0 and 1.0—that indicates how closely the ticket aligns with the user's query, as determined by the LLM's internal reasoning or scoring mechanism. In some embodiments, the JIRA identifiers are rendered as hyperlinks that, when clicked, open the full ticket either within the same interface section or in a new browser tab or window.

Field 88 presents a list of code segment summaries, each corresponding to a relevant software module, function, or class identified during the system's analysis. These summaries are generated by the LLM and are designed to give the user a high-level understanding of the purpose and functionality of the underlying code. As with the JIRA entries, each code segment may be displayed with a hyperlink that allows the user to view the full code—either in the same panel or via an external viewer, such as a web-based IDE or code repository browser. In the illustrated example, code segments are grouped beneath their corresponding JIRA tickets, but alternative arrangements (e.g., by file path, system, or functional area) are also possible.

The interface elements shown in FIG. 3 enable the user to interact with a unified, LLM-generated response that incorporates legal, organizational, and technical context. This output format allows subject matter experts, compliance officers, or software engineers to quickly understand how regulatory requirements are implemented within their enterprise systems, with traceable links to tasks and source code. In some embodiments, additional interface features may allow users to filter, export, annotate, or re-query the generated content for further investigation or documentation.

In various embodiments, the user interface shown in FIG. 3 is generated by the output/graph composer 26 of the orchestration server 14 and delivered to the user's device as part of a browser-based web page or a mobile application. In a web-based implementation, the orchestration server 14 includes a web server 16 configured to serve HTML, CSS, and JavaScript assets that define the layout and interactive behavior of the interface. The content for fields 80, 82, 84, 86, and 88 may be dynamically injected using client-side frameworks (e.g., React, Angular, Vue) based on structured data received from backend APIs in response to the user's query. The graph in field 82 may be rendered using JavaScript visualization libraries such as D3.js or Mermaid, with interactive behaviors such as zooming, hovering, or node expansion. In a mobile app implementation, the same structured content may be formatted using native UI components within a mobile framework (e.g., SwiftUI for iOS, Jetpack Compose for Android, or a cross-platform toolkit such as Flutter or React Native). The app may communicate with the orchestration server 14 over secure RESTful or GraphQL APIs to retrieve the generated response, including any linked JIRAs or code previews, which can be rendered inline or in dedicated views. In both implementations, secure authentication and role-based access controls may be applied to ensure that only authorized users can view specific content or follow embedded hyperlinks to internal systems. Although the illustrated embodiment uses a graphical interface rendered on a screen, other output modalities may be employed, including voice-based interfaces, augmented reality (AR) overlays, virtual reality (VR) environments, or command-line interfaces. These alternative modes may be supported by formatting the LLM's output in modality-specific formats and routing them to appropriate client applications capable of rendering or vocalizing the content.

In various embodiments, the system may generate role-adaptive outputs—responses tailored to the role, permissions, or informational needs of the requesting user. When a query is received via the web server 16, the orchestration engine 18 may access user profile metadata (e.g., role, department, clearance level, or historical interaction patterns) to dynamically adjust the format, detail, and content scope of the generated response. For example, a compliance officer might receive an output that emphasizes regulatory citations, legal interpretations, and coverage gaps; an engineer might receive implementation-specific insights, including links to code modules and technical dependencies; while an executive might receive high-level summaries, compliance status indicators, and associated business risks. This tailoring may be implemented by invoking different prompt templates from the prompt library 20 or by applying downstream filtering logic to the LLM-generated content. In some embodiments, the output/graph composer 26 may also adapt visual elements (e.g., simplified vs. detailed graphs) based on the recipient's role, ensuring that outputs remain interpretable and actionable across diverse enterprise audiences.

Figure 4:
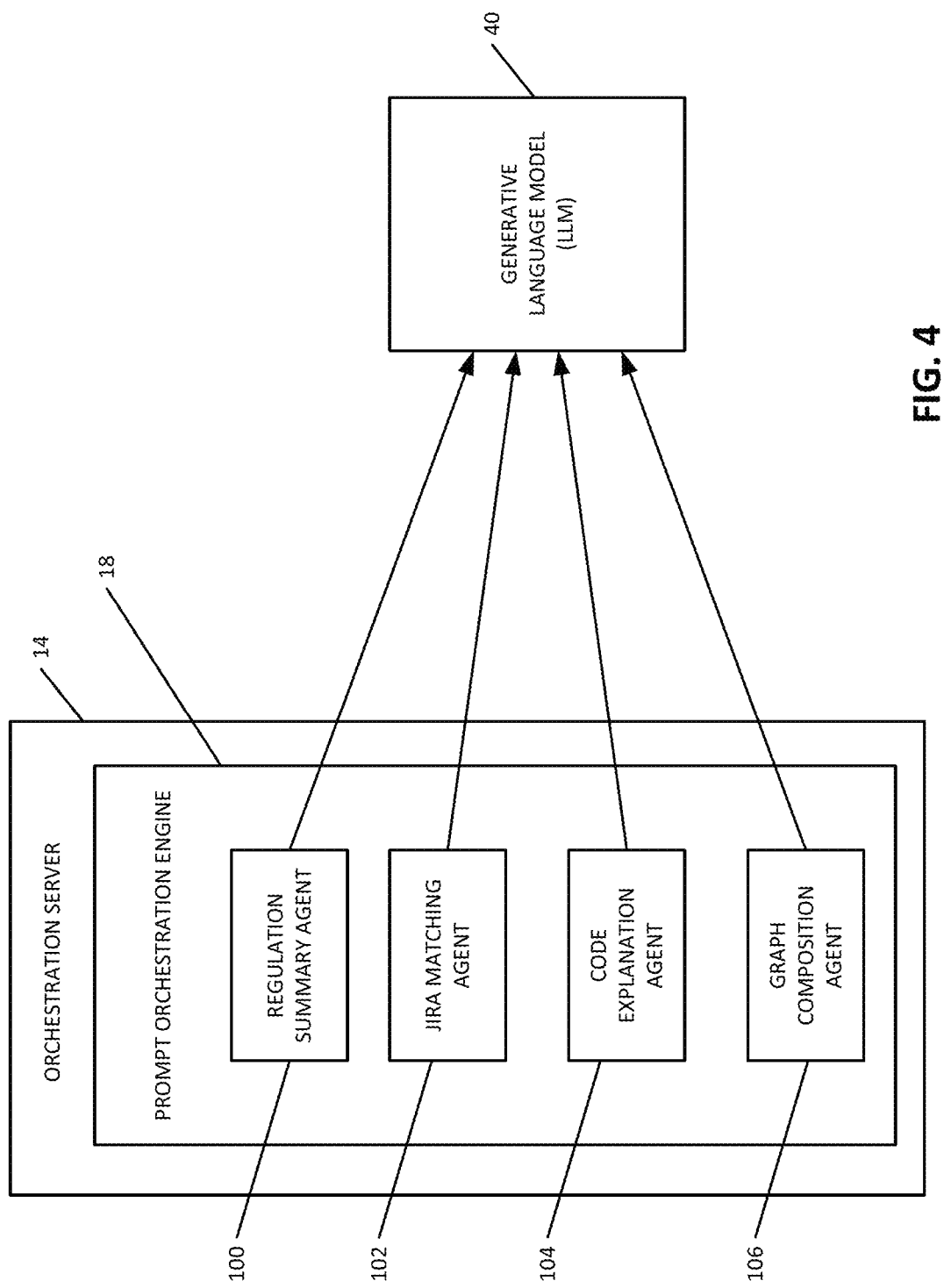
FIG. 4 is a block diagram of an agentic prompt orchestration engine according to various embodiments of the present invention.

As described in connection with FIG. 3, the output interface may include summaries of relevant regulations, task tickets, and code modules, all synthesized in response to the user's query. To generate this output, the system may employ a modular agentic architecture implemented within the orchestration server 14, such as illustrated in FIG. 4. Rather than relying on a single, monolithic invocation of the generative language model (LLM) 40, the orchestration engine 18 may coordinate multiple specialized AI agents— such as a regulation summary agent 100 (for extracting and simplifying key provisions of applicable regulations), a JIRA matching agent 102 (for identifying internal work items or task tickets that relate to the user's query or the interpreted regulation), a code explanation agent 104 (for retrieving and summarizing software code segments linked to the identified tickets), and a graph composition agent 106 (for synthesizing a structured graphical representation of the relationships between regulatory requirements, tasks, and code artifacts). Each of these agents can be optimized for a distinct subtask in the compliance reasoning pipeline, such as extracting provisions from regulatory documents (e.g., from regulatory document stores 34 in FIG. 1), identifying relevant task tickets (e.g., from a JIRA system 30), summarizing linked code segments (e.g., from code repositories 32), or generating graphical output specifications. For example, the regulatory summary agent 100 may convert complex provisions into simplified, plain-language summaries tailored to different user personas (e.g., developer, compliance officer), enhancing accessibility and audit-readiness.

These specialized agents may be implemented as software wrappers or microservices that interface with the general-purpose, transformer-based language model 40—such as GPT-4, Claude, or another commercially available LLM. Each agent can encapsulate a specific prompting strategy, set of contextual inputs, and output formatting logic tailored to its function. For example, the regulation summary agent 100 may expose a function such as "summarize_regulation(text)", which internally uses a curated prompt template from the prompt library 20 to direct the LLM 40 to extract and simplify legal language. Similarly, the JIRA matching agent 102 may invoke the LLM 40 with a prompt that ranks JIRA records by relevance to a compliance query, optionally using scoring criteria or classification logic.

From an implementation standpoint, each agent may be realized as a lightweight function, class, module, or persistent microservice. These wrappers manage the formatting and invocation of prompts, insertion of input data, and post-processing of model outputs. For instance, the code explanation agent 104 may embed a code segment into a summarization prompt, call the LLM 40 via the LLM interface 24, and extract a plain-language description of the code's function. The agent may also apply guardrails such as token budget limits, temperature settings, and response format checks. By encapsulating such behavior, each agent presents a clean functional boundary to the orchestration engine 18, which can invoke agents dynamically and in sequence, depending on the requirements of the user query.

Although FIG. 4 shows the agents as components of the prompt orchestration engine 18, it will be appreciated that each agent may be executed within the orchestration server 14 or externally hosted as a callable microservice, depending on deployment needs. Multiple agents may share the same underlying LLM instance while exhibiting distinct behaviors due to their specialized prompts, input schemas, and output contracts. In some cases, agents may use fine-tuned models other than the general-purpose LLM—such as task-specific classifiers or graph generation engines. Intermediate outputs from one agent (e.g., JIRA matches) may be routed as inputs to another (e.g., for code summarization), enabling a pipeline-style execution across agents. This modular configuration increases interpretability, flexibility, and fault isolation while still leveraging powerful transformer-based inference.

The orchestration engine 18 may support dynamic registration of newly defined agents through a plug-and-play interface. Newly introduced agents—defined by a prompt schema, routing rules, and a target function—can be onboarded without disrupting existing workflows or requiring retraining of prior models.

In some embodiments, the system may be configured to support audit readiness by maintaining structured traceability between user-submitted queries, the AI system's intermediate reasoning steps, and the underlying enterprise artifacts (e.g., regulatory clauses, task tickets, source code). For example, when a user submits a compliance-related query, the orchestration engine 18 may log the selected prompt templates, the sequence of invoked agents (e.g., regulation summary agent 100, JIRA matching agent 102), and the data sources accessed via connectors 22. The resulting structured response—delivered through the user interface shown in FIG. 3—may include hyperlinks or embedded references that tie each explanatory element (such as a code summary or ticket list) to its original system of record. This transparency allows regulatory reviewers, auditors, or internal risk officers to examine not only the final output but also the provenance of each cited element. Additionally, the orchestration engine 18 may persist query sessions, metadata, and retrieval logs in an audit log database, enabling retrospective review of the AI system's reasoning pathways. In some implementations, version control information (e.g., code commit hashes or document timestamps) may also be captured to support time-specific reproducibility. This capability facilitates defensible decision-making and compliance with regulatory expectations regarding explainability and auditability of AI-driven outputs.

In some embodiments, the system may be configured to facilitate task creation and workflow automation in response to user queries or system-identified gaps. For example, when the orchestration engine 18 processes a compliance-related query—such as how a given regulation is implemented within the enterprise—it may determine, via its agentic pipeline (e.g., using the regulation summary agent 100 and the JIRA matching agent 102), that no existing JIRA tickets or engineering tasks are associated with a particular regulatory clause or control. In such cases, the orchestration engine 18 may trigger the creation of a draft JIRA ticket, service request, or similar workflow object, either autonomously or subject to human-in-the-loop approval. This draft may include suggested titles, descriptions, regulatory references, responsible teams, and links to related code segments, based on the LLM-generated output and underlying system metadata.

Workflow automation may further include routing the generated tasks through integration with enterprise tools such as JIRA, ServiceNow, or internal ticketing systems via the API connectors 22. The orchestration engine 18 may apply business logic or policy constraints—e.g., assigning the ticket to a particular engineering group based on a regulatory domain tag or triggering notifications if a required control has not yet been implemented. In some embodiments, the LLM 40 or specialized agents (e.g., a workflow planning agent) may also suggest sequencing or dependency information for the tasks (e.g., one ticket must be completed before another), enabling richer project planning. This automated generation and enrichment of action items enhances operational responsiveness, reduces human oversight burden, and enables timely remediation of compliance gaps discovered during AI-driven inquiry.

In some embodiments, the system may include a self-contained system summary agent-a specialized AI agent configured to generate a concise but comprehensive explanation of the system's internal reasoning, intermediate steps, and supporting data used in formulating a response to the user's query. This agent can be implemented as a wrapper around a general-purpose LLM, such as GPT-4, and may be invoked by the orchestration engine 18 either automatically for traceability purposes or in response to a user request for additional explanation. The system summary agent may ingest structured logs, intermediate outputs from other agents (e.g., the regulation summary agent 100, JIRA matching agent 102, and code explanation agent 104), and contextual metadata (e.g., prompt templates, connector queries, and scoring thresholds). It can then produce a natural-language summary of what data was retrieved, which reasoning paths were taken, how relevancy decisions were made, and how the final outputs were synthesized. In some implementations, this summary may also include confidence estimates, LLM function call traces, or data provenance links. The resulting explanation improves transparency, trust, and auditability, particularly in regulated or safety-critical environments.

In some embodiments, the system may include functionality for tracking data provenance to ensure that outputs generated by the LLM 40 and its associated agents are auditable and explainable. For example, when the orchestration engine 18 composes a structured response using outputs from multiple specialized agents (e.g., regulatory summary, ticket matches, code explanations, graph visualizations), each element of the output may include metadata identifying its source data, the system or API connector that retrieved it, the specific prompt template used, the LLM model version, and the time of retrieval. These provenance annotations may be embedded directly into the structured output (e.g., as invisible metadata, hyperlinks, or tooltips in a rendered UI), or stored in an associated audit log. For graphical outputs, nodes and edges in the visualized graph may include references to the underlying JIRA tickets, code files, or regulatory clauses from which they were derived. This enables downstream users—such as compliance officers, auditors, or technical reviewers—to trace each portion of the generated response back to its authoritative source, promoting transparency and enabling detailed post hoc review of the reasoning process.

Referring back to FIG. 1, the user device 12 may be implemented as any suitable computing device capable of network communication, such as a desktop computer, laptop, tablet, or mobile device. In preferred embodiments, the user device 12 includes a web browser configured to render a user interface served by the orchestration server 14. Through this browser interface, a user may submit natural language prompts and receive structured outputs. The user device 12 communicates with the orchestration server 14 over an electronic data network, such as a corporate intranet or the Internet, using conventional communication protocols (e.g., HTTPS over TCP/IP).

The orchestration server 14 is preferably implemented as a network-connected computing system, which may include a single physical server, a virtual machine, a containerized application cluster (e.g., deployed via Kubernetes), or a cloud-based compute instance (e.g., on AWS, Azure, or Google Cloud). In exemplary embodiments, the orchestration server 14 comprises one or more processors, system memory, persistent storage, and network interfaces. The server executes software components that implement the functions of the web server 16, prompt orchestration engine 18, prompt library 20, API connectors 22, LLM interface 24, and output/graph composer 26.

The web server 16 may be implemented using any conventional web framework, such as Flask or FastAPI (Py-thon), Express.js (Node.js), or a Java-based server (e.g., Spring Boot). It serves a browser-based UI to the user device 12 and exposes API endpoints to receive natural language prompts. In some implementations, the UI may be rendered as a single-page application (SPA) using a frontend framework such as React or Vue.js.

The prompt orchestration engine 18 comprises program logic that parses incoming prompts, performs intent classification (e.g., via keyword matching, embeddings, or shallow neural networks), and selects or retrieves appropriate prompt templates from the prompt library 20. The prompt library 20 may be implemented as a local or distributed data store (e.g., a JSON file, YAML-based repository, or SQL/NoSQL database) containing reusable text templates with dynamic placeholders for task-specific inputs.

In some embodiments, the prompt library 20 comprises a curated collection of prompt templates designed to guide the behavior of a generative language model (LLM) in response to user queries. These prompt templates may be created manually by subject matter experts, software architects, or legal and compliance professionals, and may optionally be refined through automated testing or reinforcement learning. Each template may include a base prompt text configured to elicit a specific behavior or type of output from the LLM (e.g., regulatory summarization, ticket retrieval, code explanation), along with associated metadata indicating applicable domains, task types, expected output formats, or confidence thresholds. Templates may be stored in structured formats such as JSON, YAML, or Markdown and organized by category, topic, or access priority. In preferred embodiments, prompt templates may also include parameter slots or placeholders (e.g., for user query fragments, retrieved document text, or structured references), which can be dynamically filled by the orchestration engine 18 during runtime. The prompt templates may be tested using validation corpora or benchmark queries to ensure accuracy, robustness, and consistency of the LLM-generated responses. Templates may also be versioned to support governance, auditing, and iterative improvement over time.

In some implementations, the prompt library 20 is centrally stored in a document store, a version-controlled repository, or a managed configuration database, and may be accessed programmatically by the prompt orchestration engine 18. The orchestration engine 18 may index available templates, associate them with tags or routing logic, and expose them to the LLM 40 via tool descriptions or prompt function interfaces. For example, a "summarize regulation" prompt may include a system instruction directing the LLM to extract key obligations from a legal text input, while a "trace JIRA references" prompt may instruct the LLM to identify and narrate linked issues or implementation details from a task management system. The prompt library 20 may also include compound or modular prompts, which can be composed into multi-step sequences to handle complex workflows or multi-part outputs.

Additional embodiments of curated prompt libraries, including their creation, versioning, testing, and orchestration, are described in commonly assigned U.S. patent application Ser. No. 19/191,343, filed Apr. 28, 2025, the entirety of which is hereby incorporated by reference. The prompt library 20 of the present invention may adopt any of the template formats, orchestration techniques, or design strategies disclosed in that application.

The API connectors 22 are software modules or services configured to communicate with internal enterprise systems using authenticated API calls. These connectors may utilize RESTful APIs, GraphQL, SOAP, or proprietary protocols depending on the internal system. For example, the JIRA system 30 may be accessed via Atlassian's REST API, enabling the retrieval of ticket metadata, status, linked code branches, and comments. Code repositories 32 may include Git-based systems (e.g., GitHub Enterprise, GitLab, Bitbucket), accessed via HTTPS or SSH, and parsed using command-line tools or direct API integration. Regulatory document stores 34 may be implemented as document management systems (e.g., SharePoint, Confluence, or custom databases) and queried for relevant textual content. Knowledge graphs 36 may be implemented using graph databases (e.g., Neo4j, Amazon Neptune, RDF triple stores), and may expose query interfaces via Cypher, SPARQL, or other graph query languages.

The LLM interface 24 is a software module that facilitates communication between the orchestration server 14 and an external generative language model (LLM) 40. In preferred embodiments, the LLM 40 is hosted by a third-party provider such as OpenAI, and is accessed via a public API (e.g., OpenAI's chat/completions endpoint). Communication occurs over HTTPS using secure API keys or OAuth-based credentials, and may include request headers, usage metering, and logging.

The LLM 40 may be implemented using a transformer-based architecture, such as GPT-3.5, GPT-4, or a similar model. Transformer-based LLMs operate by receiving input text tokenized into subword units or word pieces, which are embedded into high-dimensional vectors. These embeddings are processed through a stack of self-attention layers and feed-forward networks to generate context-aware output tokens. The model's output is typically a sequence of tokens that can be converted back into human-readable text. In function-calling modes, the LLM may also return structured JSON responses conforming to predefined schemas. The LLM 40 performs contextual reasoning based on the prompt and input content provided by the orchestration server 14 and returns one or more outputs for further processing.

The output/graph composer 26 receives the raw outputs from the LLM 40 and synthesizes them into user-facing responses. This may include assembling multiple parts of a response (e.g., regulatory summary, ticket list, code analysis), formatting them for display, embedding hyperlinks to JIRA tickets or source files, and generating visual graphs. Graphs showing relationships between JIRA tickets and source code may be constructed using a graph processing library (e.g., NetworkX, Graphviz) and rendered as SVG or HTML elements using client-side libraries (e.g., D3.js or Mermaid).

The orchestration server 14 acts as an intermediary between the user device 12, the LLM 40, and the internal systems 30-36. The LLM 40 does not have direct access to the internal enterprise systems. Instead, the orchestration server 14 retrieves relevant data from internal systems, optionally filters or summarizes it, and constructs prompts that are then submitted to the LLM 40. This architecture ensures that sensitive enterprise data remains protected and only selectively exposed to the generative model as needed to fulfill user queries.

The orchestration server 14 may be implemented using one or more computing systems comprising processors, memory, data storage, and network interfaces. It may be deployed in a cloud-based environment, on-premises infrastructure, or distributed architecture, and may operate as a containerized microservice or set of services. The orchestration engine 18 and associated components—such as the prompt orchestration engine, agent interfaces, and data connectors—may execute as modular software components, agents, or services on general-purpose or specialized hardware configured to perform the orchestration, prompt generation, task coordination, and data routing operations described herein. The LLM interface 24 may be implemented as an API gateway, service wrapper, or integration module that manages communication between the orchestration server 14 and one or more large language models (LLMs), whether hosted externally (e.g., via third-party APIs) or deployed locally. It may handle request formatting, authentication, token budgeting, prompt injection, and response parsing, and may support both stateless and stateful interactions depending on the deployment architecture.

In one general aspect, therefore, the present invention is directed to computer-implemented methods and computer systems for responding to a regulatory query pertaining to an enterprise. The method, according to various embodiments, comprises the step of receiving, by an orchestration engine executing on a backend computer system for the enterprise, a query from a user device, the query pertaining to a regulatory requirement associated with a product or service of the enterprise. The method also comprises the step of identifying, by the orchestration engine, a plurality of subtasks to fulfill the query, the subtasks including at least a regulation interpretation subtask, a task-matching subtask, and a code-explanation subtask. The method also comprises, for each of the plurality of subtasks: retrieving, by the orchestration engine, a task-specific prompt from a prompt library stored in memory, the prompt library comprising pre-authored natural language prompts associated with respective regulatory subtasks; invoking, by the orchestration engine, a large language model (LLM) hosted on a computing infrastructure remote from the orchestration engine, where invoking the LLM comprises providing the task-specific prompt and associated contextual data to the LLM; and receiving, by the orchestration engine, from the LLM, an intermediate output generated in response to the task-specific prompt. The method also comprises the steps of processing, by the backend computer system, the intermediate outputs of the subtasks to generate a structured response, where the structured response comprises a machine-readable, electronically formatted structured response; and transmitting, by the backend computer system, the structured response to the user device.

A computer system for responding to a regulatory query pertaining to an enterprise comprises, according to various embodiments, a backend computer system configured to receive, from a user device, a query pertaining to a regulatory requirement associated with a product or service of the enterprise and a memory storing a prompt library comprising pre-authored natural language prompts associated with respective regulatory subtasks. The computer system also comprises an orchestration engine executed on the backend computer system and configured to: identify a plurality of subtasks to fulfill the query, the subtasks including at least a regulation interpretation subtask, a task-matching subtask, and a code-explanation subtask; and, for each of the plurality of subtasks: retrieve a task-specific prompt from the prompt library; invoke a large language model (LLM) hosted on a computing infrastructure remote from the backend computer system, wherein invoking the LLM comprises providing the task-specific prompt and associated contextual data to the LLM; and receive an intermediate output generated in response to the task-specific prompt. The backend computer system is further configured to: process the intermediate outputs of the subtasks to generate a structured response, where the structured response comprises a machine-readable, electronically formatted structured response; and transmit the structured response to the user device.

In various implementations, the task-specific prompt comprises a natural language function description and a structured reasoning strategy defined in the prompt library.

In various implementations, the orchestration engine is configured to invoke the LLM by executing a stateless microservice configured to format the prompt and communicate with the LLM. In yet other implementations, the orchestration engine is configured to invoke the LLM by executing a callable software agent comprising executable instructions for preparing inputs, invoking the LLM, and post-processing outputs.

In various implementations, the structured response comprises: a regulatory summary section comprising simplified text derived from the regulation; a task record section listing relevant task records with metadata; and a code explanation section comprising textual summaries of associated source code segments.

In various implementations, the orchestration engine is further configured to invoke a regulation summary agent to generate a regulatory summary by extracting and simplifying provisions from a stored regulatory document using a summarization prompt.

In various implementations, the orchestration engine is further configured to invoke a task-matching agent to compute a relevance score for each task record based on semantic similarity to the regulatory summary. The orchestration engine may be further configured to invoke a code explanation agent to extract referenced source code segments linked to task records and generate a natural language explanation using a pre-authored code summarization prompt.

In various implementations, the orchestration engine is executed as a containerized service deployed in a cloud-based computing environment, wherein the containerized service comprises orchestration logic, prompt management, and agent invocation modules.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for responding to a regulatory query pertaining to an enterprise, comprising:
    receiving, by an orchestration engine executing on a backend computer system for the enterprise, a query from a user device, the query pertaining to a regulatory requirement associated with a product or service of the enterprise;
    identifying, by the orchestration engine, a plurality of subtasks to fulfill the query, the subtasks including at least a regulation interpretation subtask, a task-matching subtask, and a code-explanation subtask;
    selecting, by the orchestration engine, for each of the subtasks, a corresponding software agent of the orchestration engine, wherein each corresponding software agent comprises executable instructions and is configured to retrieve a task-specific prompt template from a prompt library and to invoke a large language model (LLM) using the task-specific prompt template, wherein the LLM is hosted on a computing infrastructure remote from the orchestration engine;
    for each of the plurality of subtasks:
        retrieving, by the corresponding software agent of the orchestration engine, the task-specific prompt template from a prompt library stored in memory, the prompt library comprising pre-authored natural language prompts associated with respective regulatory subtasks;
        invoking, by the orchestration engine, the LLM, wherein invoking the LLM comprises;
            invoking the LLM via an LLM interface over an electronic data network using an authenticated API call;
            providing the task-specific prompt template and associated contextual data to the LLM; and
            receiving, by the orchestration engine, from the LLM, an intermediate output generated in response to the task-specific prompt template;
    processing, by the backend computer system, the intermediate outputs of the subtasks to generate a structured response, wherein the structured response comprises a machine-readable, electronically formatted structured response; and
    transmitting, by the backend computer system, the structured response to the user device.

2. The method of claim 1, wherein the task-specific prompt template comprises a natural language function description and a structured reasoning strategy defined in the prompt library.

3. The method of claim 1, wherein invoking the LLM comprises executing a stateless microservice configured to format the task-specific prompt template and communicate with the LLM.

4. The method of claim 1, wherein invoking the LLM comprises executing a callable software agent comprising executable instructions for preparing inputs, invoking the LLM, and post-processing outputs.

5. The method of claim 1, wherein the structured response comprises: (i) a regulatory summary section comprising simplified text derived from the regulation; (ii) a task record section listing relevant task records with metadata; and (iii) a code explanation section comprising textual summaries of associated source code segments.

6. The method of claim 1, wherein the regulation interpretation subtask is performed by invoking a regulation summary agent configured to generate a regulatory summary for a relevant regulation pertaining to the regulatory query by extracting and simplifying provisions from a stored regulatory document pertaining to the relevant regulation using a summarization prompt.

7. The method of claim 6, wherein the task-matching subtask is performed by invoking a task-matching agent configured to compute a relevance score for each task record based on semantic similarity to the regulatory summary.

8. The method of claim 7, wherein the code-explanation subtask is performed by invoking a code explanation agent configured to extract referenced source code segments linked to task records and generate a natural language explanation using a pre-authored code summarization prompt.

9. The method of claim 8, further comprising retrieving, by the orchestration engine, from the prompt library, a prompt sequence comprising a regulatory summary prompt, a task-matching prompt, and a code explanation prompt, wherein the sequence is stored in a workflow graph data structure.

10. The method of claim 1, wherein the orchestration engine is executed as a containerized service deployed in a cloud-based computing environment, wherein the containerized service comprises orchestration logic, prompt management, and agent invocation modules.

11. The method of claim 1, further comprising dynamically formatting, by the backend computer system, the structured response based on a role of a user logged in via the user device.

12. A computer system for responding to a regulatory query pertaining to an enterprise, comprising:

a backend computer system configured to receive, from a user device, a query pertaining to a regulatory requirement associated with a product or service of the enterprise;

a memory storing a prompt library comprising pre-authored natural language prompts associated with respective regulatory subtasks;

an orchestration engine executed on the backend computer system and configured to:

identify a plurality of subtasks to fulfill the query, the subtasks including at least a regulation interpretation subtask, a task-matching subtask, and a code-explanation subtask;

select, for each of the subtasks, a corresponding software agent of the orchestration engine, wherein each corresponding software agent comprises executable instructions and is configured to retrieve a task specific prompt template from the prompt library and to invoke a large language model (LLM) using the task-specific prompt template, wherein the LLM is hosted on a computing infrastructure remote from the backend computer system; and for each of the plurality of subtasks:

retrieve a task-specific prompt template from the prompt library;

invoke the LLM, wherein invoking the LLM comprises:

invoking the LLM via an LLM interface over an electronic data network using an authenticated API call;

providing the task-specific prompt template and associated contextual data to the LLM; and receive an intermediate output generated in response to the task-specific prompt template;

wherein the backend computer system is configured to:

process the intermediate outputs of the subtasks to generate a structured response, wherein the structured response comprises a machine-readable, electronically formatted structured response; and transmit the structured response to the user device.

13. The system of claim 12, wherein the task-specific prompt template comprises a natural language function description and a structured reasoning strategy defined in the prompt library.

14. The system of claim 12, wherein the orchestration engine is configured to invoke the LLM by executing a stateless microservice configured to format the task-specific prompt template and communicate with the LLM.

15. The system of claim 12, wherein the orchestration engine is configured to invoke the LLM by executing a callable software agent comprising executable instructions for preparing inputs, invoking the LLM, and post-processing outputs.

16. The system of claim 12, wherein the structured response comprises:

a regulatory summary section comprising simplified text derived from the regulation;

a task record section listing relevant task records with metadata; and a code explanation section comprising textual summaries of associated source code segments.

17. The system of claim 12, wherein the orchestration engine is further configured to invoke a regulation summary agent to generate a regulatory summary by extracting and simplifying provisions from a stored regulatory document using a summarization prompt.

18. The system of claim 17, wherein the orchestration engine is further configured to invoke a task-matching agent to compute a relevance score for each task record based on semantic similarity to the regulatory summary.

19. The system of claim 18, wherein the orchestration engine is further configured to invoke a code explanation agent to extract referenced source code segments linked to task records and generate a natural language explanation using a pre-authored code summarization prompt.

20. The system of claim 12, wherein the orchestration engine is executed as a containerized service deployed in a cloud-based computing environment, wherein the containerized service comprises orchestration logic, prompt management, and agent invocation modules.

* * * * *